May 14, 1929.  C. P. HUDSON  1,712,793
ICE CREAM FREEZER
Filed June 30, 1926  4 Sheets-Sheet 1

Inventor.
Charles P. Hudson
By John C. Hawk
Attorney.

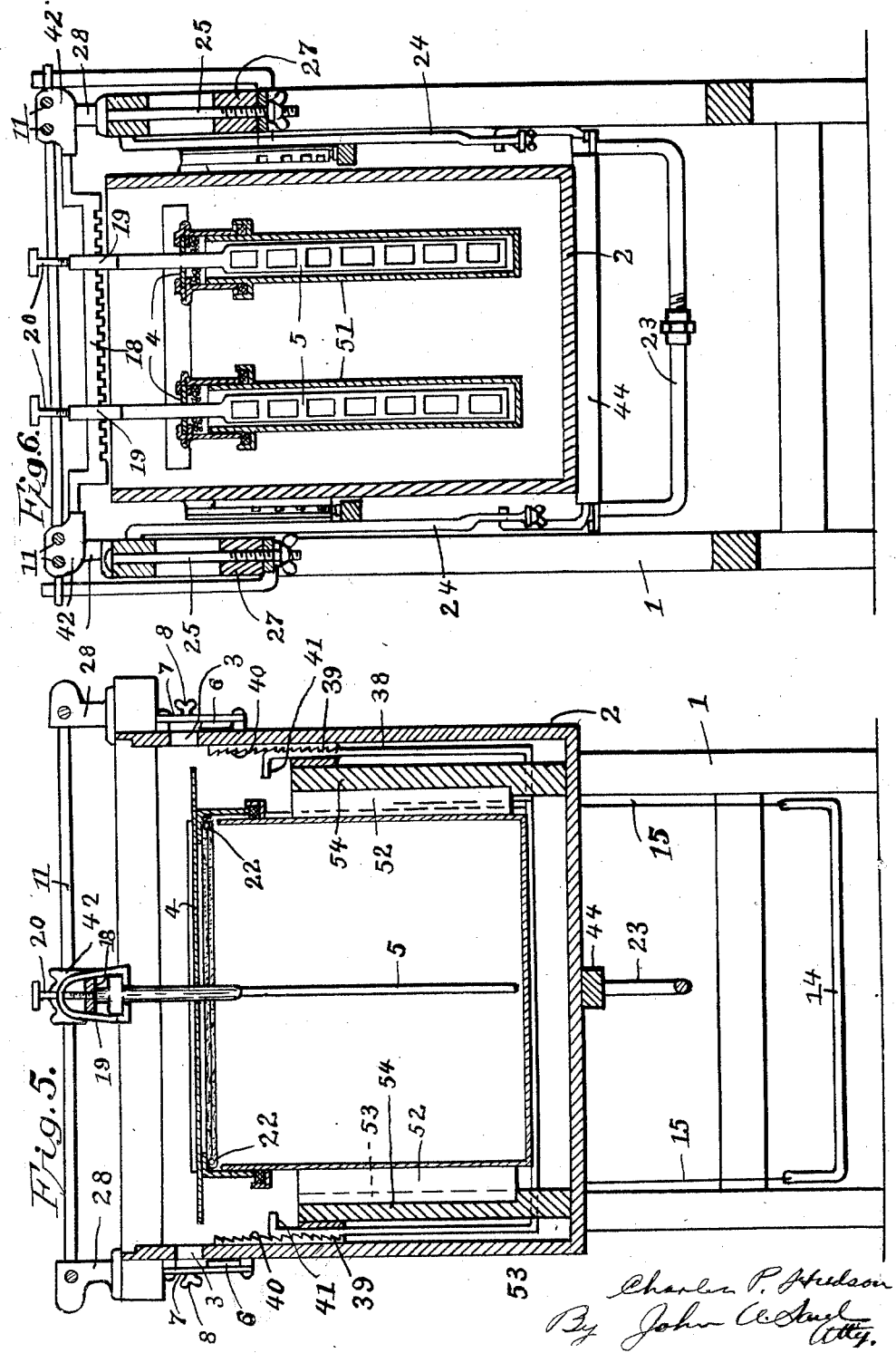

May 14, 1929.  C. P. HUDSON  1,712,793
ICE CREAM FREEZER
Filed June 30, 1926    4 Sheets-Sheet 3
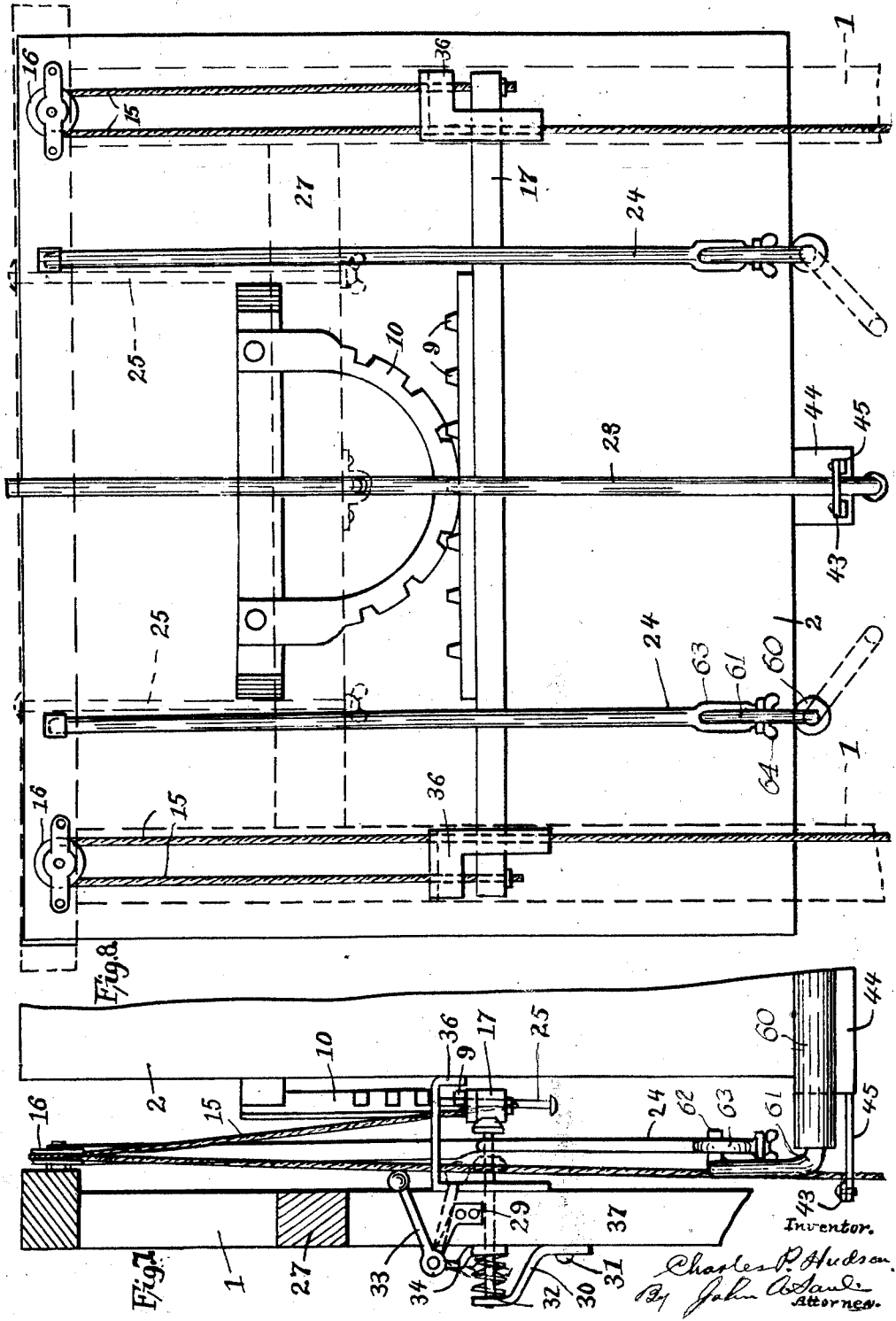

May 14, 1929.  C. P. HUDSON  1,712,793
ICE CREAM FREEZER
Filed June 30, 1926   4 Sheets-Sheet 4
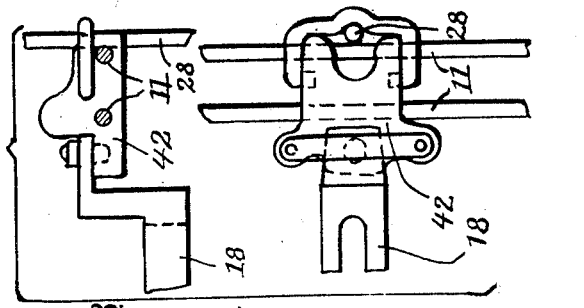
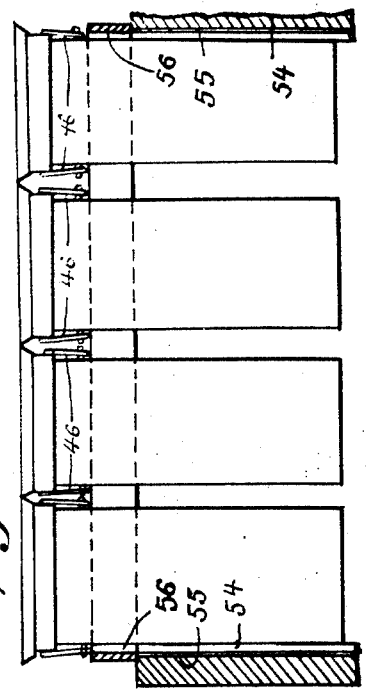
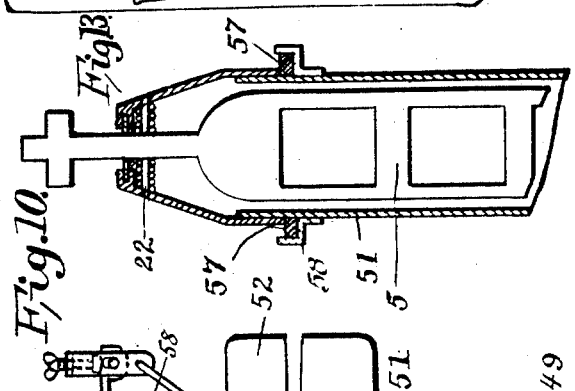
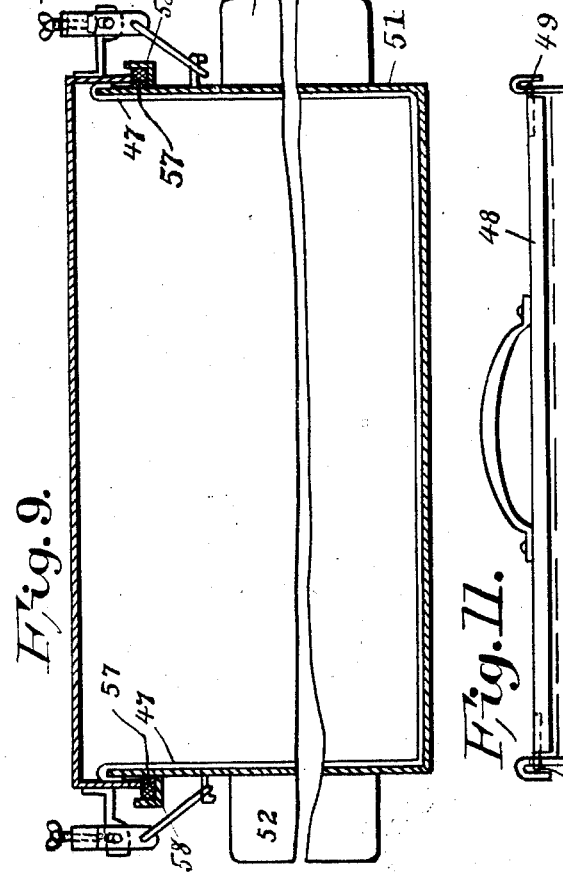

Patented May 14, 1929.

1,712,793

UNITED STATES PATENT OFFICE.

CHARLES P. HUDSON, OF PHILADELPHIA, PENNSYLVANIA.

ICE-CREAM FREEZER.

Application filed June 30, 1926. Serial No. 119,679.

My invention relates to ice cream freezers; and more particularly to a device for freezing and whipping the cream, it being so constructed that it may be used for freezing the ice cream in bulk or loose form, and is provided with a plurality of cans and dashers differing in size, so that a variety of flavors can be whipped and frozen, and the contents removed from the cans and stored in suitable receptacles. If fancy or Neapolitan brick cream is desired the batches are whipped and frozen in the cans and a smooth velvet-like consistency is obtained, and the cans are then raised and the bobinet open top and dashers are removed from the cans, and a closed top made for the purpose takes the place of the open top.

The object of the invention is to so construct the same that it will be simple, durable, easily and cheaply manufactured, the parts may be restored or repaired when defective, and it can be manipulated without trouble.

In the drawings forming a part of this specification and in which like letters of reference represent corresponding parts in the several views:—

Figure 5 is a longitudinal section;

Figure 6 is a cross-section of the device;

Figure 7 is a fragmentary view showing the means of locking the track to the rocker;

Figure 8 is a side view of my invention;

Figure 9 is a vertical longitudinal section of a can, showing the means for removing the cream;

Figure 10 is a cross-section showing a larger can for freezing in bulk;

Figure 11 shows the lifter for removing the bricks from the can;

Figure 12 is a sectional view showing a series of small cans; and,

Figure 13 is a sectional top and side view of the dasher bar.

Figure 1:
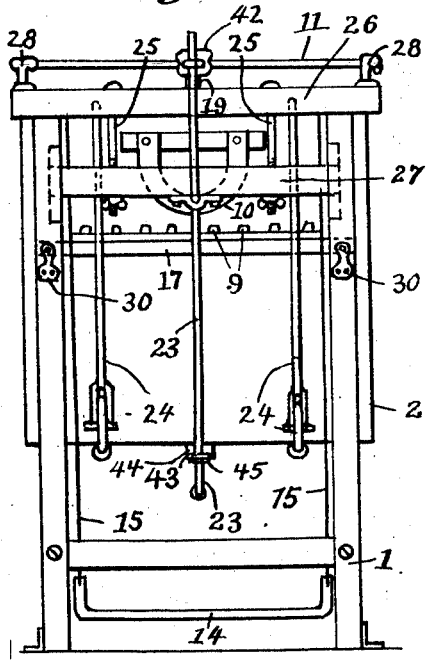
Figure 1 is a side view of my device.
Figure 2:
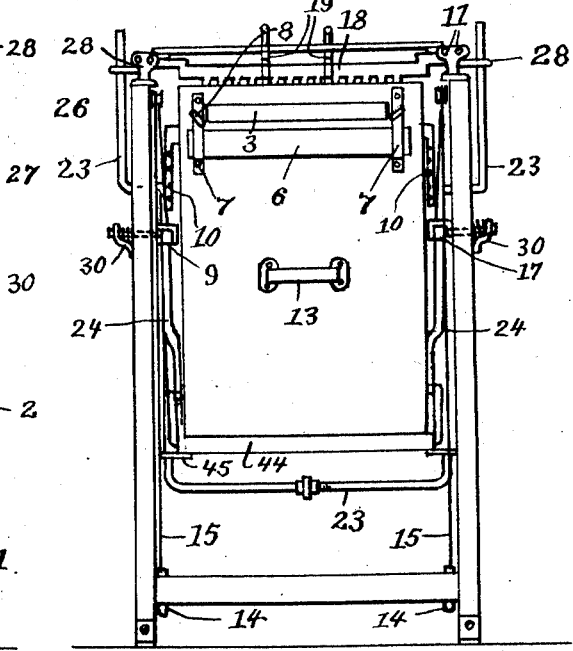
Figure 2 is an end view of the same.
Figure 3:
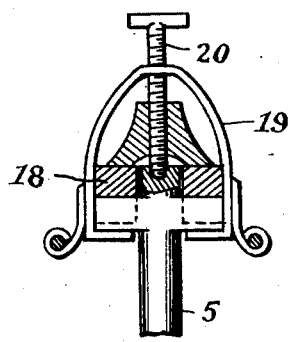
Figure 3 is a sectional view illustrating the clamping device for holding the dashers to the cross-bar.
Figure 4:
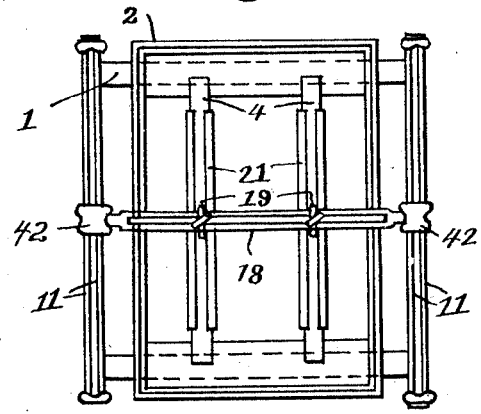
Figure 4 is a plan view of the device, illustrating the ways and dashers working in the same.

The numeral 1 represents the frame of the device; 2 the freezer or cabinet; and 3 are openings in the ends of the cabinet for the purpose of permitting the slides 4, when reciprocated, to pass in and out of the same.

The slides 4 carry the dashers 5 in the operation of the device. 6 are drop covers for closing the openings 3 when the device is used in molding and hardening and the dashers are not in operation. 7 are straps acting as guides for covers 6, and are adapted to be locked in position by set-screws 8. 9 is a track which is adapted to engage segmental rack 10 when the device is used for molding; and to be disengaged when used for whipping or freezing. 11 are railings on each side of the frame, the same supporting the dashers 5; and 13 are handles on the ends of the cabinet to operate the freezer.

14 is a treadle to raise the track and connect the same with the segmental rack when the device is to be used for molding. The wire 15 is connected to the treadle and passes over pulleys 16, the ends of the wire being attached at 17 to the track to support the same. 18 represents the dasher bar carrying the dashers, said dashers being adjustable on the bar to adapt them for cans of different dimensions. 19 are clamps embracing the dasher-bar and adapted to be locked in the teeth of the same when the screw 20 is operated.

21 are ways in which the slides 4 reciprocate when the dashers are in movement; and 22 are bars having threads wound upon the same to prevent the cream from splashing out or running from the cans. 23 is an arm which connects with the bottom of the cabinet and the dasher at the top and pivoted on bar 27, to operate the dashers; and 24 are hangers which support the cabinet when the same is reciprocated, and is disconnected from the segmental rack 9. 25 are screw-bolts on each side of the machine, the same passing through the top of the frame 26 and cross-pieces 27, the object of the same being to adjust or regulate the stroke of the dashers. At the base of the cabinet are tubes 60 within which operate rods 61, having cranks 62. The cranks are adapted to engage in eyes 63 at the base of rods 24, and to be locked therein by thumb-nuts 64 when the rods are in operation. In Figure 8 the cranks are shown clamped in the eyes and in dotted lines are shown out of operation.

28 are brackets connected to the top rail 26 of the stand upon which the device is operated, the same forming bearings for rail 11. 29 are short shafts passing through the frame of the device; 30 a plate connected by bolt 31 to the frame; and 32 is a spring on shaft 29 the purpose of the same being to connect the track and rocker. Arm 33 is for the purpose of throwing the track and rocker out of gear when the cabinet is to be used for whipping and freezing. 34 is a forked arm embracing shaft 29, the purpose of the same being to compress the spring and release the track from the rocker when arm 33 is operated.

35 is a bolt journaled in bracket 36, said bracket being connected to the frame by bolts 37. Bolt 35 passes through track 17. 38 is a metallic frame for the purpose of drawing the cans up from the brine, and has at the upper portion of the same a ratchet 39 which is adapted to operate in connection with ratchet 40 on the interior of the cabinet; and 41 is an angular portion of arm 38 for the purpose of operating the same. The dasher bar 18 rests in slides 42 on railings 11. 43 is a lock-plate connected by blocks 44 underneath the cabinet, said plate is pivoted to slides 45 on both sides of the machine, so that when it is desired to lock the rod 23 which operates the dashers the lock-plate is closed.

In Figure 12 which gives a sectional view of a smaller form of can for the manufacture of ice or block cream, I have shown catches 46 for the tops of the same. 47 is a lifter for removing the cream from the cans; and 48 a handle having catches 49, which lock in perforations 50 in the lifter. 51 is the usual form of can used in the machine, the same having wings 52 which are adapted to rest in grooves 53 in blocks 54. When the smaller cans are to be used in the cabinet the blocks 54 are reversed, so that grooves 55 in the opposite side of the same may receive the straps 56 which rest in said grooves. 57 is a gasket in the flanges 58 to seal the same.

The operation of the device will be clear from the foregoing description, the main object being to construct a freezer which can be rocked when it is desired to harden the cream, which is accomplished by means of a segmental rack cooperating with a track; and when it is desired to whip the cream then the segmental rack is disengaged from its track by means of a catch at each end of the main supporting frame. The track is raised and lowered by means of a pulley mechanism; and the dashers are adjustable along a dasher bar, which enables the device to be used with different sized receptacles. Hangers support the cabinet to permit the swinging motion of the same.

Having now fully described my invention, what I claim as new, and desire to secure by Letters-Patent, is:—

1. An ice cream freezer, comprising a cabinet, a rack and track to produce a rocking motion, hangers to support the cabinet and produce a swinging motion, a dasher bar supported on the cabinet, clamps embracing the dasher bar, dashers carried by the clamps, means for adjusting and removing the dashers, and means to change the swinging motion to a rocking motion.

2. An ice cream freezer, comprising a segmental rack connected to the same, a track connected to the frame with which said rack engages when a rocking motion is desired, means to disengage the rack from the track, an arm embracing the cabinet and pivoted to the frame to give a reciprocating motion to the dashers when desired, and lockable hangers to support the cabinet when the rack and track are disconnected.

3. An ice cream freezer, comprising a main supporting frame, a cabinet, hangers supporting the same, means to give a rocking and reciprocating motion to the cabinet, railings on the sides of the frame, slides connected to the railings, a dasher bar journaled in the slides and adapted to move therewith, dashers connected to the dasher bar, means for adjusting the dashers on the dasher bar to adapt them to cans of different diameters, and slides connected to the cans and adapted to move with the dashers.

4. An ice cream freezer, comprising a rack connected to the same, a main frame to support the freezer, a track supported by the frame with which the rack is adapted to engage, a treadle, connections between the treadle and track to raise the track, shafts journaled to the frame of the device and adapted to engage and lock the track, and an arm to release the shafts.

5. An ice cream freezer, comprising a frame, a receptacle, means for detachably connecting said receptacle to said frame for swinging movement, a rack on said receptacle, a track on said frame, and means for detachable engagement of said rack and track to produce a rocking movement of said receptacle.

6. An ice cream freezer, comprising a frame, a receptacle mounted on said frame for swinging or rocking movement, dashers in said receptacle, and means for reciprocating said dashers horizontally in a direction opposite to the direction of swing of said receptacle, comprising an upright bar pivoted to said frame, means below the pivot point for connecting said bar to said receptacle, means above said pivot point for connecting the bar to the dashers.

In testimony whereof I affix my signature.

CHARLES P. HUDSON.